Feb. 27, 1923.

J. A. MARTIN

HEATER

Filed June 13, 1922

1,447,142

INVENTOR;
JESSE A. MARTIN,
BY
Graham+Davis
ATTORNEYS.

Patented Feb. 27, 1923.

1,447,142

UNITED STATES PATENT OFFICE.

JESSE A. MARTIN, OF LOS ANGELES, CALIFORNIA.

HEATER.

Application filed June 13, 1922. Serial No. 567,912.

*To all whom it may concern:*

Be it known that I, JESSE A. MARTIN, a citizen of the United States, residing at Los Angeles, in the county of Los Angeles, State of California, have invented a new and useful Improvement in Heaters, of which the following is a specification.

My invention relates to heaters, and is particularly a heater adapted to use in heated air heating and ventilation systems.

It is an object of the invention to provide a new and improved form of heater which will accomplish a very efficient interchange of heat between the combustion products and the recipient air.

It is a further object of the invention to provide a heater of this character which is simple of construction and which may be economically manufactured.

The especial advantages of the invention and further objects thereof will be made evident hereinafter.

Referring to the drawing, which is for illustrative purposes only:

Figure 1:
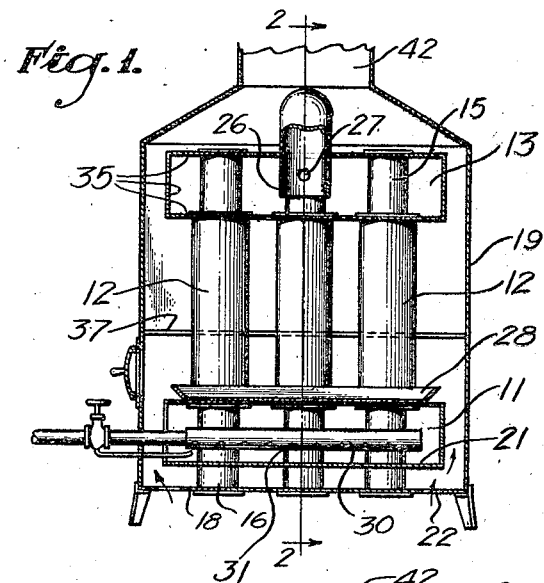
Fig. 1 is a longitudinal sectional view through a heater embodying my invention.
Figure 2:
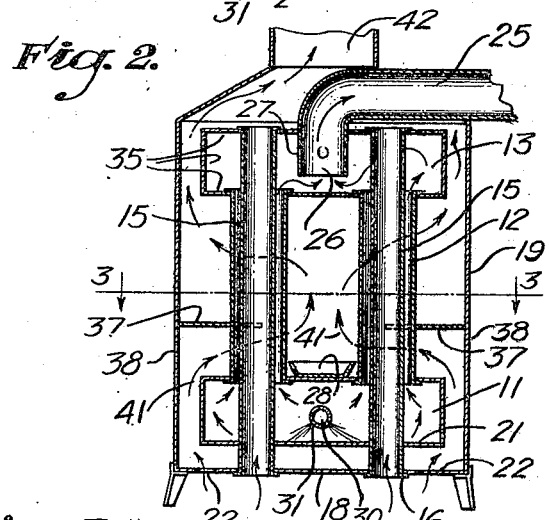
Fig. 2 is a section taken on the vertical plane represented by the line 2—2 of Fig. 1.
Figure 3:
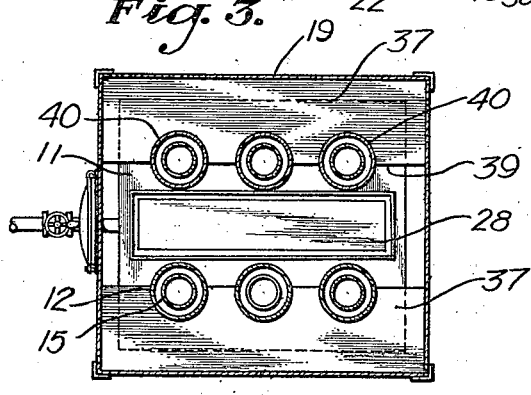
Fig. 3 is a section taken on the horizontal plane represented by the line 3—3 of Fig. 2.

As shown in the drawing, a combustion chamber 11, constructed of sheet metal, is provided. This combustion chamber has sheet metal tubes 12 extending upwardly therefrom, the upper ends of these tubes being connected into a header 13. Centrally within the tubes 12 and through the combustion chamber 11 and the header 13, sheet metal tubular members 15 are extended, these members having open ends through which the air to be heated may travel. Although the lower ends 16 of the tubes 15 are shown extending through the bottom 18 of the housing 19 so that the recipient air may be drawn directly from the exterior into the tubes 15, these tubes may extend only to the bottom wall 21 of the combustion chamber 11, as holes 22 are provided in the bottom 18 of the housing 19 through which cold air is also drawn into the heater.

From the top of the header 13 a flue 25 for the discharge of combustion gases is provided, this flue extending downwardly into the header 13 as indicated at 26 and having holes 27 formed therein, so that the flow of combustion gases through the flue 25 is somewhat increased thereby. A pan 28 is placed upon the top of the combustion chamber between the rows of tubes 12 in which water may be placed for humidifying the air as it is heated.

The burner which I employ in this heater consists of a pipe 30 which extends longitudinally within the combustion chamber 11 and has two rows of holes 31 placed in the under side thereof, these holes being laterally directed so that the flames are spread out along the bottom 21 of the combustion chamber and rise up along the sides of the combustion chamber, thus providing a very complete distribution of heat to the walls of the chamber through which the heat is transferred to the recipient air within the chamber enclosed by the housing 19.

The combustion gases rise through the tubular passages formed between inner and outer tubular members 15 and 12, heating these tubular members during this passage, and from thence proceeding into the header 13 and therein transferring the greater portion of the heat now remaining in the combustion gases to the walls 35 of the header. From the header 13 the combustion gases, from which the heat has been almost entirely removed, are carried through the flue 25 to the chimney or stack provided for conducting the same to the exterior of the building. Deflector plates 37 extend from the side walls 38 of the housing 19 to points 39 between the tubular member 12, indentations 40 being cut therein so that the edge of the plate will adhere to the contour of the members 12, thus providing means for directing the air in a circuitous path between the tubes 12, as indicated by the arrows 41, the heated air passing around the header 13 and outwardly through the discharge opening 42 provided in the top of the housing 19. Air is also drawn through the tubular members 15, this air being heated by radiation and by contact with the tubes as it passes upwardly therein, and joining the outflowing stream of heated air with which it is carried through the opening 42 to the point of application.

A particular feature of the invention resides in the simple manner in which a very large heat radiating surface is provided by the use of inner and outer tubular members such as I employ, it being possible with the construction I have devised to form heater units of any desired capacity.

The internally extending end 26 of the flue 25 has the function of holding the combustion products within the header 13 until the maximum of heat is given off therefrom into the recipient air stream, and the placement of holes 27 in the end 26 as shown is for the purpose of allowing just the right amount of the upper heated air strata to enter the flue 25 to establish the necessary draft for the support of proper combustion. In my experiments with this part of the heater, I have found the employment of the holes 27 to increase the efficiency of the furnace fifteen percent over the construction not employing such holes.

I claim as my invention:

1. A heater comprising: walls forming a combustion chamber; tubes extending upwardly from said combustion chamber and having their interiors in open communication with the interior of said chamber; a header into which the upper ends of all of said tubes are connected, the interior of each of said tubes being in open communication with the interior of said header; a flue connected into said header; a burner in said combustion chamber; tubular members each extending centrally through one of said tubes and being connected into the upper wall of said header, each of said tubular members being also connected into the lower wall of said combustion chamber and extending downwardly therefrom below said combustion chamber; and a housing surrounding the structure previously described, said tubular members being secured in the bottom of said housing and forming the sole support of said structure which does not touch said housing at any other point except where said flue passes through said housing, the lower portion of said housing being perforated to admit external air thereto.

2. A heater comprising: walls forming a combustion chamber; tubes extending upwardly from said combustion chamber and having their interiors in open communication with the interior of said chamber; a header into which the upper ends of all of said tubes are connected, the interior of each of said tubes being in open communication with the interior of said header; a flue connected into said header, the inner end of said flue projecting down into said header and having small holes in the sides thereof; a burner in said combustion chamber; tubular members each extending centrally through one of said tubes and being connected into the upper wall of said header, each of said tubular members being also connected into the lower wall of said combustion chamber and extending downwardly therefrom below said combustion chamber; and a housing surrounding the structure previously described, said tubular members being secured in the bottom of said housing and forming the sole support of said structure which does not touch said housing at any other point except where said flue passes through said housing, the lower portion of said housing being perforated to admit external air thereto.

In testimony whereof, I have hereunto set my hand at Los Angeles, California, this 7th day of June, 1922.

JESSE A. MARTIN.